United States Patent [19]

Grodinsky et al.

[11] Patent Number: 5,982,905
[45] Date of Patent: Nov. 9, 1999

[54] DISTORTION REDUCTION IN SIGNAL PROCESSORS

[76] Inventors: Robert M. Grodinsky, 4448 W. Howard St., Skokie, Ill. 60076; David G. Cornwell, 3735 N. Ridgeway Ave., Chicago, Ill. 60618

[21] Appl. No.: 08/787,122

[22] Filed: Jan. 22, 1997

Related U.S. Application Data

[60] Provisional application No. 60/010,393, Jan. 22, 1996.

[51] Int. Cl.$^6$ .................................................. H04B 15/00
[52] U.S. Cl. ........................................... 381/94.1; 381/394
[58] Field of Search .............................. 381/77, 94.1, 394

[56] References Cited

U.S. PATENT DOCUMENTS

| | | |
|---|---|---|
| 4,087,773 | 5/1978 | Jencks et al. . |
| 4,533,795 | 8/1985 | Baumhauer, Jr. et al. ............. 381/174 |
| 4,691,363 | 9/1987 | Khanna .................... 381/394 |
| 4,712,247 | 12/1987 | Swarte ....................................... 381/96 |
| 4,751,417 | 6/1988 | Krinickas, Jr. et al. . |
| 4,835,424 | 5/1989 | Hoffman et al. . |
| 4,908,870 | 3/1990 | Nagi ........................................... 381/96 |
| 4,964,738 | 10/1990 | Lindsay et al. ........................... 381/77 |
| 5,099,518 | 3/1992 | Lindsay et al. . |
| 5,239,589 | 8/1993 | Yang et al. .............................. 381/394 |

OTHER PUBLICATIONS

Journal Audio Eng. Soc. Mar. 1989, vol. 37, No. 3, pp. 119–128.
Stereophile Magazine, Oct. 1995, pp. 63–69.
Phillips Technicl Review, vol. 32, pp. 226–231, No.'s 6–8, 1971.

*Primary Examiner*—Vivian Chang

[57] ABSTRACT

A signal processing distortion reducing system which includes a plurality of series connected, straight, conductive signal path sections. These sections direct the flow of signal currents into a series of sharp 90 degree turns, which minimizes electromagnetic coupling between adjacent conductive signal path sections. These 90 degree turns have a distortion reducing, collimating effect on electromagnetic signals. Variations in construction include machined squares and bent strips of sheet material.

15 Claims, 6 Drawing Sheets

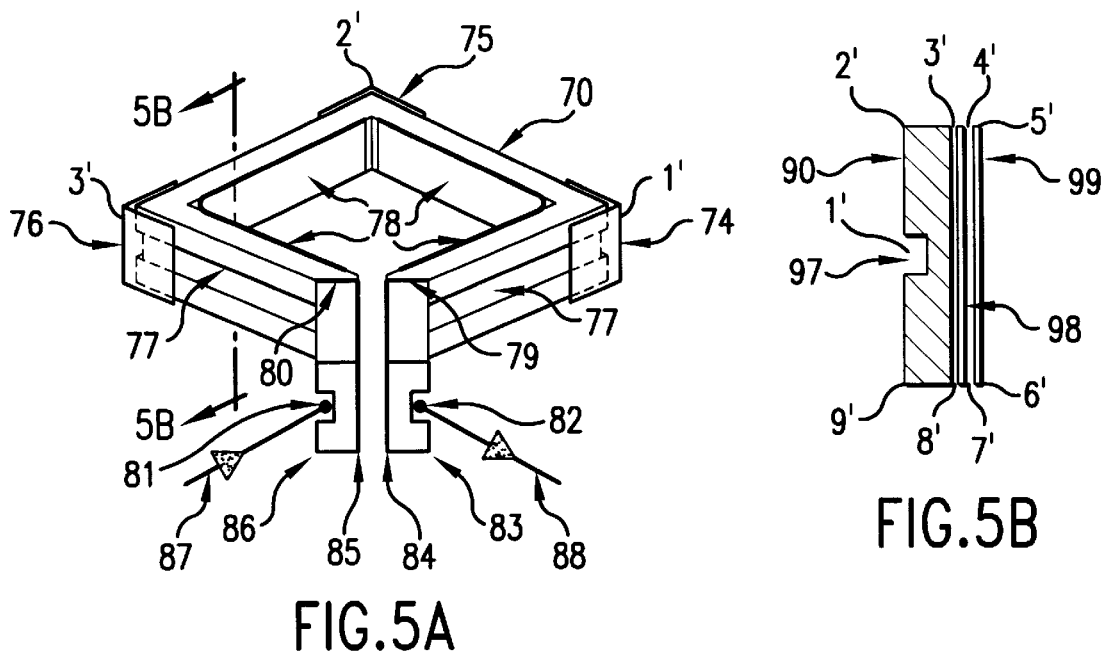
FIG.5A
FIG.5B
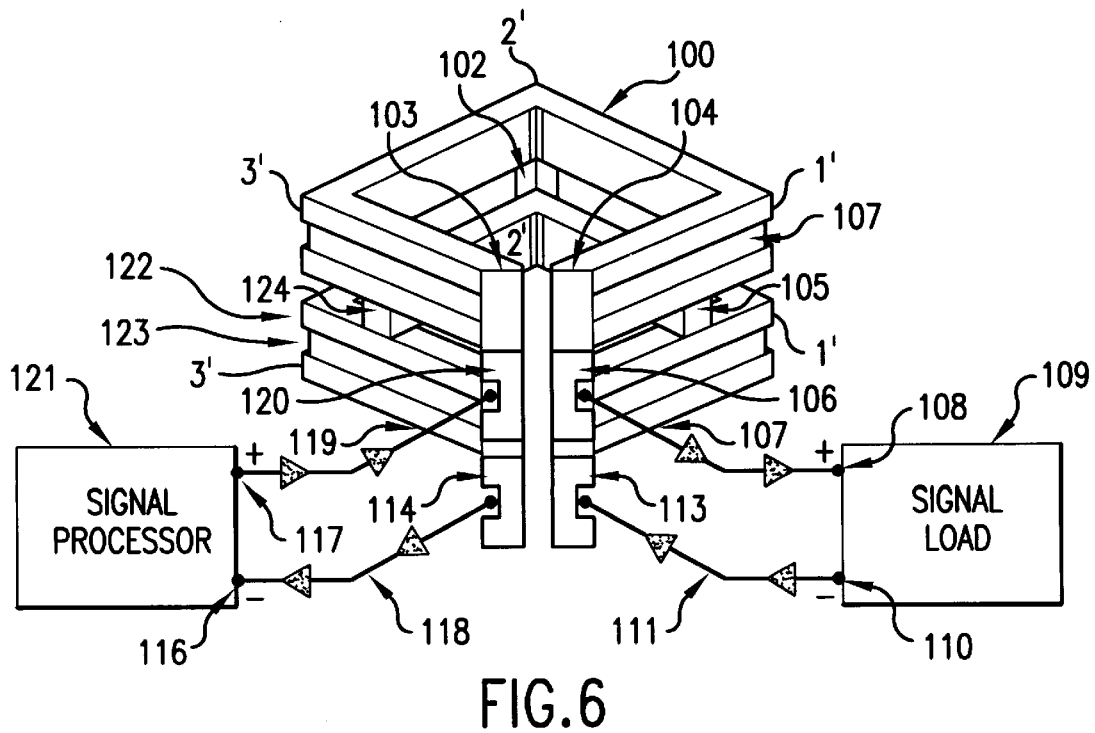
FIG.6

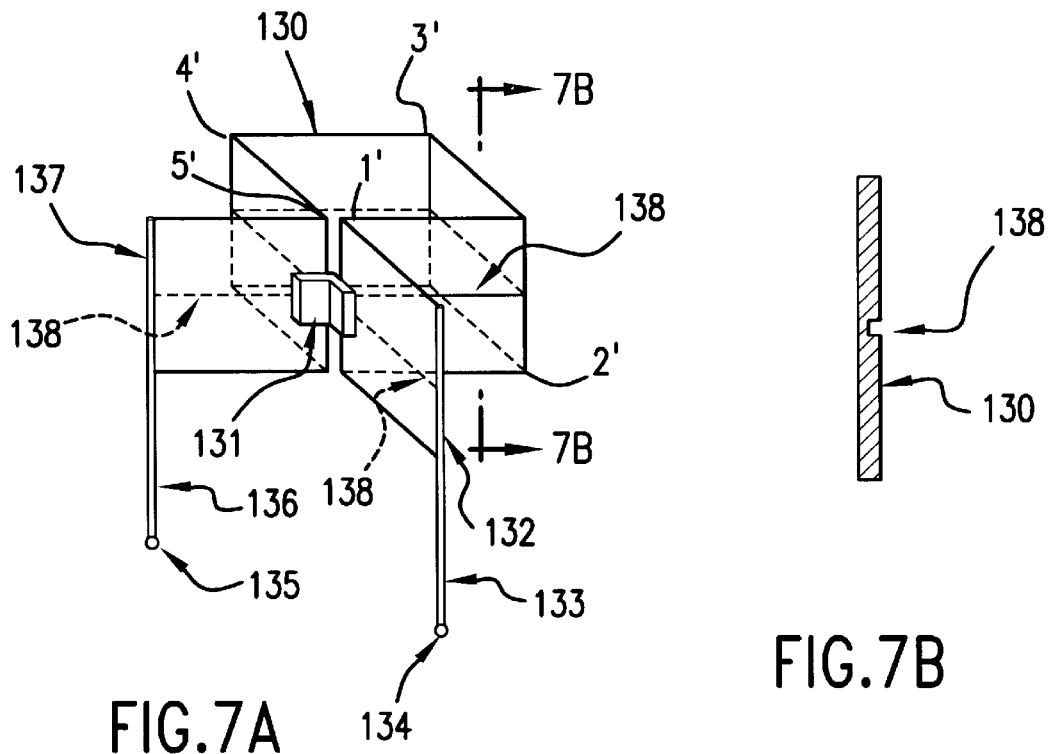
FIG.7A
FIG.7B
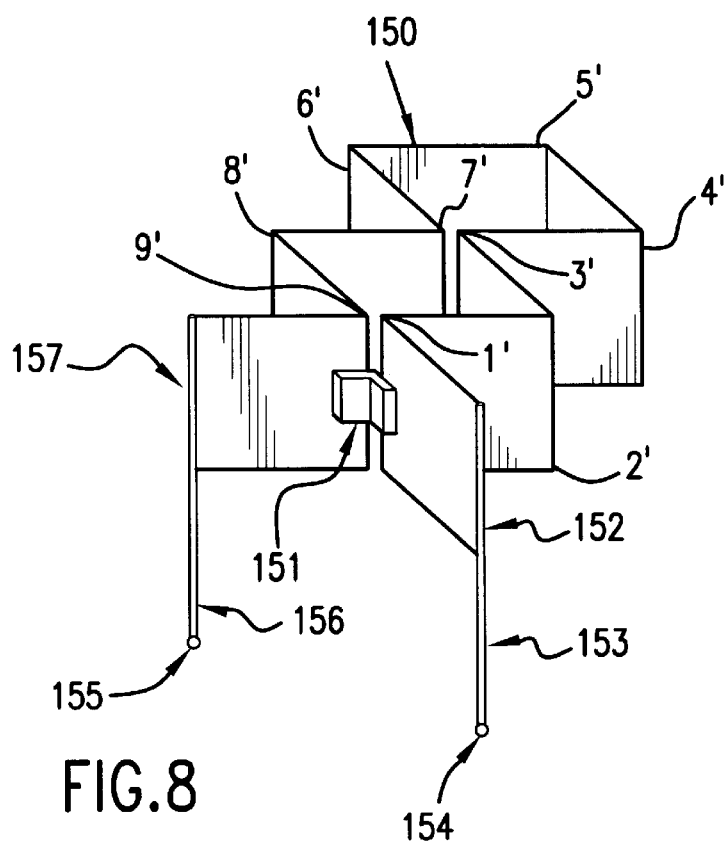
FIG.8

DISTORTION REDUCTION IN SIGNAL PROCESSORS

This application is based on Provisional Application No. 60/010,393 filed Jan. 22, 1996. Other pertinent references include Disclosure Document #372995, dated Mar. 27, 1995, Disclosure Document #376199, dated May 12, 1995, Disclosure Document #378028, dated Jul. 10, 1995, Disclosure Document #383069, dated Oct. 10, 1995, and Disclosure Document #383260, also date Oct. 10, 1995.

BACKGROUND OF THE INVENTION

This invention relates to a newly discovered form of AC signal processing distortion and means for reducing this distortion. In the prior art, many sources of signal processing distortions have been identified, quantified and reduced. Each of the many components which make up AC signal processing systems contribute some known form of distortion. Active devices such as transistors or FET's have non-linear transfer characteristics which cause amplitude related distortions such as harmonic and intermodulation distortion. Passive devices, such as resistors and capacitors, introduce phase or time related distortions as a result of both structure and the materials used in construction of such components.

This invention addresses hitherto, unrecognized electromagnetic field effects which we have discovered to be a significant remaining cause of signal degradation in all AC signal processing systems. We have developed techniques for reducing this form of signal degradation in individual components, as well as that resulting from complex multi-stage AC signal processing systems. As a convenience we have named this newly identified signal degradation as "State" distortion. This type of signal distortion is correctable by the unique multi-junction conductive structures, of the subject invention. This form of State distortion, occurs in active and passive components, wires, printed circuit assemblies, and in most electromagnetic transducers. We also believe that the corrective devices and practices of this invention relate to eddy current effects in conductive materials.

Several technical papers are worth noting as background for this patent. A Model of Loudspeaker Driver Impedance Incorporating Eddy Currents in the Pole Structure, by John Vanderkooy, March 1989 Vol.37 No. 3, pp 119–128, Jour Audio Eng. Soc., analyzes the dispersive related energy storage and "semi-inductive" phase effects of eddy currents in permeable conductive materials. In Stereophile magazine, October 1995, pp 63 to 69 a paper by Malcolm O. Hawksford of The University of Essex examines electrical signal propagation in non permeable conductors from the point of view of audio transmission line performance. This paper also discuses the effects of highly dispersive eddy currents as a contributing factor to time delayed energy storage in conductors. In The Philips Technical Revue, Vol. 32 pp 226–231, No. 6,7&8, 1971, V. Belevitch mathematically analyzes eddy current distribution in ribbon conductors.

We have observed that in sound reproduction or reinforcement the effects of State distortions are perceived as a loss of stereo image information, alterations in the harmonic structures of signals produced by musical instruments, and inaccuracies in the dynamic characterisics, especially noticeable in reproduction of the human voice. The well known harshness and truncation of ambient decay information of digital signal processing and recording, appears to be at least partially a form of State distortion, whose objectionable effects some forms of the subject invention appear to correct.

In video or other image electrical signal processing. State distortions result in compression of color and gray scale, reduced picture detail and exaggeration of color and contrast. These effects combine to degrade the perception of front to back object depth so that a typical video picture is both flatter in perspective and less natural in color. The improvements of the subject invention result in video images which resemble the best printed color reproductions of works of art.

As a practical matter, it is virtually impossible to correct each of the hundreds if not thousands of the random, such State caused distortions that must occur in virtually every signal processing system. We have found that the State distortion correction devices of this invention have a unique ability to reduce such distortions after they have been generated, in a degree unachievable even with complex digital error correcting circuits. We know of no other methodology of the prior art which addresses and reduces this form of distortion to the degree, or in such a practical and cost effective manner, as that achieved by the subject invention.

SUMMARY OF THE INVENTION

A State distortion correcting effect is achieved by inserting in the signal path of a signal processing system, a form of the State distortion reducing means of the invention. Such means comprise a plurality of series connected, generally low impedance, AC signal current path sections which introduce multiple 90 degree changes in the direction of flow of the AC signal current at the junction thereof. We have found that each 90 degree intersection of two conductors forms a State correcting junction. Such a current path modifying system which includes at least two, and most desirably, an odd number of 90 degree changes in the direction of AC current flow [i.e. formed by at least four of said path sections], comprises one aspect of this invention. The distortion reduction current modifying devices of this invention can be used in circuits which provide either a series or a parallel deployment of such devices.

In another variation of State distortion reducing structures, a center tap is provided which provides the advantage in some circuits, of reducing the number of needed corrective devices.

Another important aspect of the invention combines pairs of these multiple current path devices into negative feedback configurations, for the purpose of further improving the distortion reduction characteristics of the invention. Other variations of the State distortion reducing aspects of this invention can be incorporated directly into acoustic and other transducer structures where they effectively reduce many of the distortions of current transducer constructions.

Our discovery of the existence of State distortion and of structures and methods for reducing it, began with experiments on electromagnetic loudspeakers similar to those in our U.S. Pat. No. 5,070,530 issued Dec. 3, 1991, to the inventors. This patent describes and claims a technique for reducing magnetic distortion in transducers by reducing the effects of signal related AC electromagnetic fields. This reduction in magnetic distortion was obtained by incorporating a radial slot in each of the top and bottom plates and in the toroidal ceramic magnet of ring magnetic transducers. These slots reduce circulating eddy currents in the plates and dielectric currents in the magnet. A further reduction of eddy current related distortions in electromagnetic transducers was also the subject of our U.S. Pat. No. 5,357,587, issued Oct. 18, 1994, to the inventors. In this patent we described and claimed methods for reducing eddy current related distortion by transversely dividing and electrically insulating sections of the center pole structure of a transducer so as to confine eddy currents to only a portion of the center pole.

After the issuance of this last patent, in pursuit of still further reductions in eddy current related distortion in loudspeakers, we investigated the effect of adding, one at a time, a number of shallow rectangular radial grooves to the bottom plate of a loudspeaker, constructed according to our patents U.S. Pat. No. 5,070,530 and U.S. Pat. No. 5,357,567. We intended these grooves to reduce the magnitude of eddy currents by increasing their path length and thereby the series resistance they encountered. The use of such eddy current controlling grooves is well known in the art of high current structures powered from 60 HZ and higher frequency power lines, where such grooves are used to improve efficiency. We observed in carefully controlled listening comparisons, that the sound of this loudspeaker had a noticeably different accuracy of reproduction as grooves were added, and that this quality varied with the "eveness" or the "oddness" of the total number of grooves in this modified bottom plate. While an increase in the number of grooves did result in a reduction of eddy current related distortion, the most consistent sonic improvements in this loudspeaker occured whenever the total number of grooves was an "odd" number. After additional experimentation with loudspeaker plates and poles, in which we varied the total "count" or "State" condition, as we then came to call these effects, we concluded that the sonic changes produced by shallow rectangular grooves in the steel material forming loudspeaker plates, were the result of the abrupt 90 degree changes in the direction of eddy currents which these grooved imparted. Other controlled listening tests between loudspeakers with grooves of different depths, revealed that changes in the quality of reproducion occurred only for those frequencies where the theoretical skin depth of the eddy currents was approximately equal to or less than the depth of the grooves. Regardless of whether the radial grooves were in the face of a speaker pole tip, or on a surface of a bottom or top plate, the sound reproduction from that loudspeaker was always more dynamic, less colored, and more realistic when the total groove count was "odd" then when the total count was "even."

Other listening experiments with conductors and/or with resistors in series and in parallel combinations, led us to conclude that improvements in sound were also apparent in odd total combinations of these parts. The sound of a combination of either series or parallel conductors and/or resistors, in which either the series or the parallel total of parts equaled an "odd" number was always preferable when compared with the sound of a similar assembly totaling an "even" number. These changes were, however, subtle in comparison with the improvements in sound quality obtained in our experiments with loudspeakers.

Further experiments with a variety of changes in the direction of current flow in series connected conductors, using both audio and video signal processing systems, convinced us that sharply defined 90 degree changes in a conductive path were the key to obtaining the desirable condition of a total State count of an odd number. We experimented with many variations and combinations of 90 degree turns in different conductor shapes and sizes, as well as in a variety of conductor materials including copper, aluminum, and steels, evaluating these devices in signal processing systems at audio frequencies and also at frequencies used in FM and television transmission.

An unexpected result of inserting multiple 90 degree junction devices into audio signal paths, was a pronounced decrease in interaction between electromagnetic loudspeakers and their acoustic environment. Ordinarily, room resonances and reflections are emphasized by sound reinforcement and sound reproduction systems because typical electromagnetic loudspeakers also act reciprocally as microphones which respond to the acoustic energy of hundreds of room reflections and couple a portion of this energy back into the amplifying electronics. This multiple path acoustic feedback is further exacerbated by increasing the proportion of input/output overall loop negative feedback in power amplifiers. When the distortion reducing devices of this invention were included in the audio signal path, a unique effect was obtained. Speaker room interaction was modified, effectively reducing room standing waves, slap echo and room decay time. In experiments we conducted in a church sanctuary of approximately 450,000 cubic feet, using the subject invention, the reduction in acoustic feedback and decay time was especially noticeable. This church had Installed a professional high powered two channel power amplifier and a total of twelve 8 inch loudspeakers, distributed in pairs around the sanctuary. The acoustic overhang and microphone feedback were typical for this type of auditorium. Control of the acoustics in this large space improved with each addition of forms of State technology of this invention, either in the electronics or in the loudspeakers.

We also experimented in this church system with adding the circuit disclosed in our U.S. Pat. No. 5,356,474, issued Jan. 31, 1995, to the inventors. That patent describes a cross correlation circuit between the outputs of pairs of power amplifiers. This cross correlation improves the accuracy of a stereo image and also has a small but worthwhile effect in reducing room reverberation. The benefits of this cross correlation circuit were substantially further improved with the addition of devices of the subject invention. This combination exercised an exceptionally powerful control over the acoustics of this church. The distribution of sound became remarkably uniform from side to side and from front to back, and was much improved in speech intelligibility as a result of reduced acoustic feedback. The electronic distortions and feedback of amplified live voice and music which were typical of the original installation were now sharply reduced.

Over the course of this discovery process we made harmonic and intermodulation distortion measurements and time delay signal analysis using the well known MLSSA computerized FFT equipment. Only one type of measurement, using MLSSA to display the acoustic energy decay time in a room, gave meaningful results. These measurements showed a reduction in decay time and slap echo in a sound reproduction system when the distortion reducing devices of this invention were included in the audio signal path. We believe that the State distortions which this invention addresses represent an extremely small percentage of any signal energy. Although small, in the range of below −50 to −60 dB, this level of distortion is significant in the present art which has recording systems in production capable of in excess of 100 dB of usable dynamic range. State generated distortions mask some of the important low level information which Is now theoretically available. In current engineering thinking, subtle sources of distortion, many of them un-documentable, are being hotly debated. For example, at the November 1996 convention of the Audio Engineering Society, a workshop on CD manufacturing resulted in a confrontation between the representatives of CD manufactures and recording and mastering engineers over the issue of differences between the sound of master tapes and the resulting production CD's, as well as disagreements over the causes of audible variations in sound quality of CD records made by different manufactures. The levels of signal alteration so hotly addressed in this workshop are in the same order or even less than the distortion characteristics addressed by this invention.

We also demonstrated the aural and the video improvements which result from the subject invention to a number of individuals, some laymen, some electronic specialists and some audio professionals. Their reactions and comments verified our experiences of the improvements this invention produced in audio and of video signal processing systems. This was especially so in their ability to recognize improvements in room acoustics, which accompanied the better reproduction of recordings.

Another application of the State stabilizing devices of this invention which we explored, was their use in reducing the undesirable effects such as television "ghosts" and FM audio distortions, which are the result of multi-path radio frequency problems. These multiple path RF signals are in some ways, similar to multiple room reflections of acoustic energy, a problem previously discussed, and one in which the distortion reducing devices of this invention had proved beneficial. Experiments in which State distortion reducing devices were inserted in series with the receiving antenna leads of either an FM broadcast signal or a television broadcast signal revealed an improvement in both sound and picture quality in the case of viewing television programs, and improvements in stereo image definition and in signal fidelity was noticeable In listening to FM radio broadcasts.

One common source of State distortion can be found in the printed circuit construction used in most signal processing equipment. We believe that changes in direction of an AC signal currents, other than 90 degree changes, result in an introduction of State distortions in AC signals. The numerous changes in direction of an AC signal current which result from changes in direction of the etched circuit leads connecting various circuit components in a printed circuit layout thus becomes a source of random State distortion. Additionally, both passive and active circuit components are mounted on the printed circuit board so that their connecting leads, enter and leave the plane of the printed circuit board at a variety of angles. We have also found that solder joints which are used to make electrical connection between a circuit board and the circuit parts mounted to a printed circuit board can also contribute distortions as a result of eddy current changes which occur due to differences in conductivity and crystal structure between copper and solder.

These distortion producing conditions, result in changes to the integrity of AC information signals, analogous to the effects scattering produces on a collimated beam of light. In a scattered beam of light, energy becomes diffused, and any image information contained in the original collimated beam becomes less precise. Passing an AC information signal through a signal processing circuit appears to have a similar scattering effect on AC information signals. The present invention produces a result analogous to the corrective effect of an optical collimator acting on a scattered beam of light.

In yet another aspect of the invention, we have discovered that the accuracy of an AC signal in a conductor is strongly influenced by the smoothness of finish on the surfaces of conductors. In particular, since eddy currents of a given AC signal frequency are confined to a shallow depth in permeable conductors such as steel, the smoothness of finish of permeable conductors is especially critical. This discovery becomes of major importance in audio and ultrasonic magnetic transducer construction where permeable magnetic circuit members make up a large part of such structures.

OBJECTS OF THE INVENTION

A principle object of the invention is to provide means for reducing State distortion in signal processing systems.

A second object of the invention is to improve the accuracy of audio and of video signals.

A further object of the invention is to provide means to control and improve the reverberant characteristics of enclosed acoustic spaces.

A still further object of the invention is to reduce the effects of mull-path signals in radio frequency reception.

BRIEF DESCRIPTION OF THE DRAWINGS

These and other objects and advantages of the invention will become apparent upon reading the following description in conjunction with the drawings, in which:

FIG. 5A is a view of another variation of a State distortion correcting device incorporating further structural improvements.

FIG. 5B is a view of a cross section of the structure of FIG. 5A.

FIG. 6 is a view of a pair of State distortion reducing devices, similar to the device of FIG. 5A, configured so as to function in the negative feedback circuit of FIG. 4.

FIG. 7A is a view of another form of State distortion reducing device, utilizing thin ribbon-like conductive material.

FIG. 7B is a cross section through a portion of FIG. 7A.

FIG. 8 is a view of an extended State count variation of FIG. 7A.

DESCRIPTION OF THE PREFERRED EMBODIMENT

Figure 1:
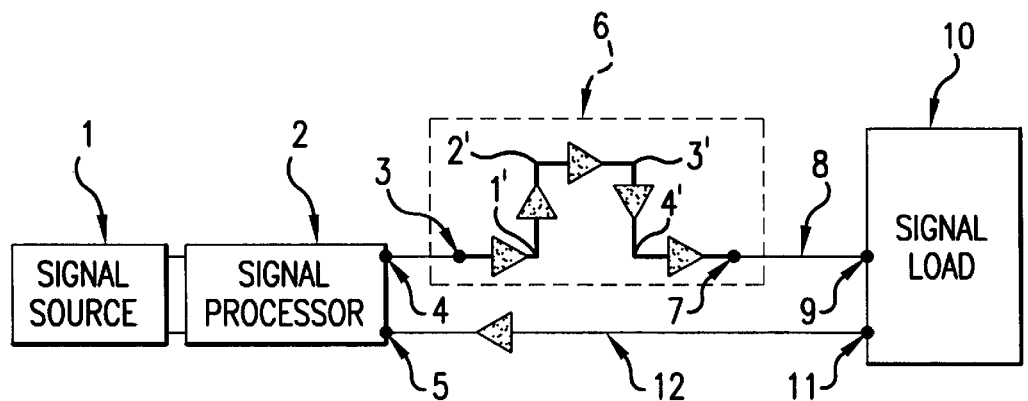
FIG. 1 is a schematic drawing illustrating a basic structure of one form of the invention.

Referring to FIG. 1, there is shown in representational form, a signal conductive structure 6, for the purpose of illustrating a first aspect of the invention. Signal source 1, is connected to signal processor 2, such as an amplifier or recording/playback system. Signal output terminal 4, of signal processor 2, connects to input terminal 3 of State distortion correcting device 6, shown enclosed by the dotted lines. As explained above, a State distortion correcting condition is created by introducing at least two substantially 90 degree turns requiring, of course, at least four adjacent current path sections. These 90 degree turns reduce the distortion produced by prior signal processing. The improvement resembles an auto-correlation or collimation process wherein noise and other non coherent signals are attenuated, resulting in a clarification of the desired information signals. In FIG. 1, four 90 degree turns are shown in the series signal current path of device 6, each one identified by primed numbers, 1' through 4'. Signal output terminal 7, of State distortion correcting device 6 is located after the fourth 90 degree turn, 4' and is connected to signal load 10, by a wire 8. Wire 12 is the signal return path connecting between signal processor terminal 5 and signal load terminal 11. Shaded arrows are included to show the direction of current flow for a single phase of a signal current in each branch of distortion reduction device 6. Because this configuration has four 90 degree bends, the device 6, imparts a total State distortion correcting count of four, an even number, to signal currents flowing between signal processor 2 and signal load 10.

Figure 2:
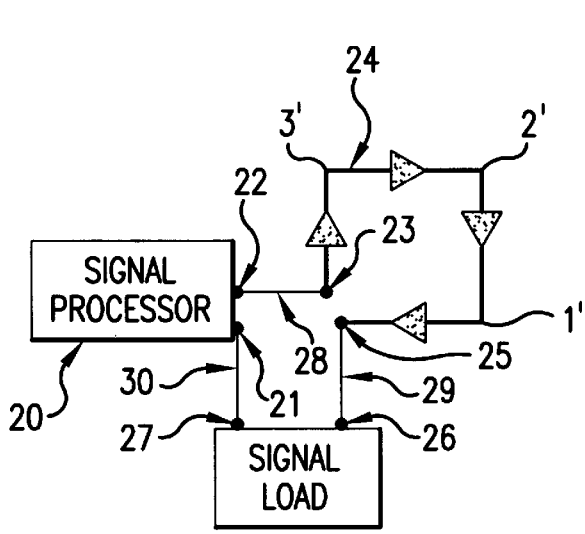
FIG. 2 is a simplified view of a second form of the invention.

In experiments with a large variety of State distortion correcting devices, we have connected the device under test in a series circuit configuration between a signal processor and a signal load as shown in FIG. 1 and in FIG. 2. In most of these experiments the signal processor was an audio power amplifier and the signal load a reference loudspeaker. The power armplifier received its input signal from a CD player, which can be programed for constant repetition of any desired signal segment. We found that evaluation using audio signals, in which our ability to detect improved dynamic range, reduced and better resolved background noise levels and the availability of having recordings of the human voice as test signals, was a quicker and more accurate evaluation technique then working with video signals. In every instance however, of comparisons of State distortion corrective devices inserted between a video tape player and a television set or monitor, our evaluations in terms of improvements to the picture quality were in general agreement with our results using audio signal tests.

FIG. 2 illustrates a second form of a State distortion correcting device 24, with an overall distortion correcting count of three an odd number, which as explained above, is preferable. As in FIG. 1, the shaded arrows show the current flow in each circuit leg of device 24 for a single phase of signal current and the primed numbers 1', 2' and 3' identify each 90 degree bend. Such 90 degree changes in the current direction, as is well known in the prior art, inherently minimizes electromagnetic field coupling between each of the pairs of signal current paths forming these 90 degree changes. Output terminal 22 of signal processor 20, is connected to terminal 23 of State distortion correcting device 24 by means of connecting wire 20. Terminal 25, of State correcting device 24 is connected to signal load terminal 26 by means of connecting wire 29. The circuit is completed with connecting wire 30, between signal load terminal 27 and signal processor terminal 21. As shown by the shaded arrows, the current flow of any single current paths in device 24 is reversed in direction from the current flow in the current path directly opposite it. These currents are so arranged that the signal generated electromagnetic fields of each of the four current path will substantially cancel the signal generated electromagnetic fields of the current path directly opposite, thus minimizing external electromagnetic fields. This configuration has several desirable advantages. Firstly reduced external electromagnetic fields minimizes undesirable interaction with other external elements unavoidably electromagnetically coupled to the State correcting device 24. Secondly, because the total number of 90 degree bends totals three, an odd number, the perceived quality of the output signal is preferable to that of the even count device of FIG. 1. A State distortion correcting device similar to that shown in FIG. 2, may be fabricated by making three right angle bends in a suitable conductive wire. This simple construction is an inexpensive but nevertheless useful device for reducing State distortion. We have found that best results are obtained when each of the three 90 degree bends are formed so as to be as abrupt and sharp as possible.

The size and type of conductive wire used for constructing the device of FIG. 2 depends on the range of frequencies over which it is to opperate. Conductor size should be approximately twice the eddy current penetration of the lowest frequency to be State distortion corrected. Eddy currents generate electromagnetic fields whuch act to expel signal currents away from the center of any conductor. This process, is well known in the prior art as skin effect. The depth of penetration is inversely proportional to the square root of the frequency, so that as frequencies increase, the depth of current penetration into the conductor decreases. For any given frequency the skin depth is also a function of the conductor's material conductivity and permeability. The formula is:

$$D = \left[\frac{2}{\mu CF}\right]^{\frac{1}{2}}$$

where D is the skin depth, $\mu$ is the permeability, C is the conductivity and F is the angular frequency. Skin depth is a result of the low velocity of propagation of eddy currents in a conductive material. The table below illustrates the skin depth for various frequencies for a typical copper conductor and for a typical low carbon steel conductor such as SME 1010 with a permeability of about 2500:

TABLE 1

| FREQ | STEEL | COPPER |
| --- | --- | --- |
| 20 Hz | 0.6 MM | 14.86 MM |
| 2K Hz | 0.06 MM | 1.48 MM |
| 20 KHz | 0.019 MM | 0.47 MM |
| 200 KHz | 0.006 MM | 0.148 MM |

Copper, brass, or aluminum wire, in practical sizes, for which skin depths are much larger at any given frequency than in steel or other permeable materials, is practical for State devices of the subject invention at higher frequencies, such as those above about 10 Khz. For low audio frequencies, below about 100 Hz, typical copper conductors of either round or square cross section are impracticably large so as to be difficult to bend into sharp 90 degree corners.

Figure 3:
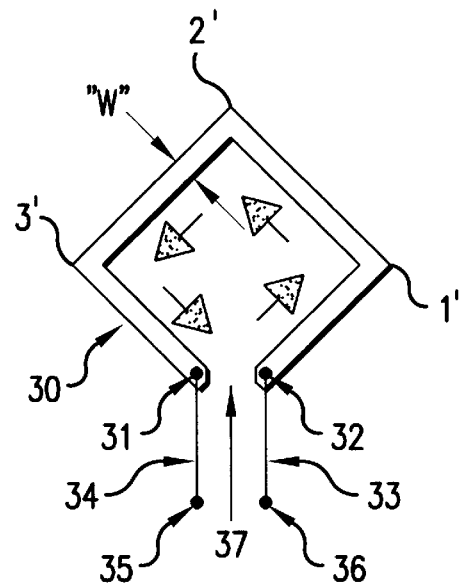
FIG. 3 is a view of an improved distortion reducing device derived from the device of FIG. 2.

FIG. 3 illustrates a structure further improved over that of FIG. 2. A hollow square, state distortion correcting device 30, having one open corner 37, is fabricated from conductive sheet metal, either by CNC machining or by punching with a die set. Signals from a signal processor, not shown, are coupled into State distortion reducing device 30 from signal input point 36 by means of wire 33 connected to terminal 32. The shaded arrows, again show the direction of current travel for a reference phase of signal current. The signal output is taken from terminal 31, connected by wire 34 to signal output point 35. Each of the 3 State distortion reducing corners of device 30, again designated by primed numbers 1' through 3', provide a 90 degree sharply defined change in the direction of signal current flow. As first noted in FIG. 2, this square shaped layout results in a substantial reduction in external electromagnetic coupling. The effectiveness of the State distortion reduction produced by any 90 degree corner is directly related to its sharpness. The construction of FIG. 3 is capable of producing a more effective State reduction in distortion than is possible with the rounded corner bending construction of FIG. 2, because fabrication by either machining or punching will produce sharper inside and outside corners. For audio frequencies, a State distortion reducing device constructed as shown in FIG. 3, can be made from 0.062 to 0.250 steel, and of an overall square dimension of between about 0.75 inches and 3 inches. We have found that the width of the conductor "W" in FIG. 3 is best kept to a minimum, commensurate with practical structural limitations. As described above, at higher frequencies, especially at radio frequencies, copper, brass, or aluminum materials may be used.

Figure 4:
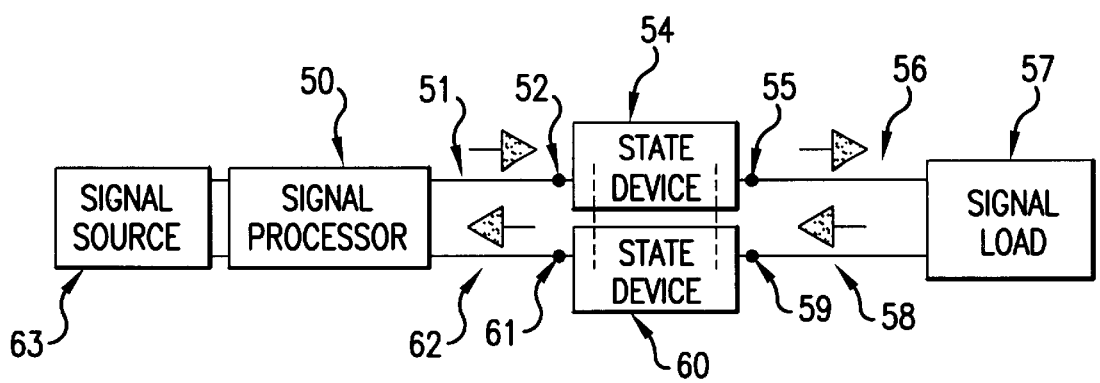
FIG. 4 is a schematic drawing illustrating a distortion correcting feedback circuit of the invention.

FIG. 4 is a circuit drawing showing a pair of State distortion correcting devices 54 and 60, connected between a signal processor 50, and an AC load 57. Signal source 63 supplies an AC signal to signal processor 50, and wires 51 and 56 connect to terminals 52 and 55 respectively, of State device 54, and wires 58 and 62 connect to terminals 59 and 61 respectively, of State device 60, as shown in the drawing. The two State corrective devices 54 and 60, constructed as shown in FIG. 2 or FIG. 3, are closely spaced and electrically insulated from each other. As a result of this spacing they are electromagnetically coupled to each other, as shown by the dotted lines between these devices. As indicated by the shaded arrows at various points in the circuit, the currents through the two State corrective devices 54 and 60, are opposite in direction from each other. The electromagnetic coupling between these two State corrective devices establishes a novel form of negative State feedback between them. This negative feedback is capable of additional reductions in State distortion in both the State corrective devices 54 and 60 as well as those State distortions generated by nonlinear signal loads such as dynamic loudspeaker systems. The improvements resulting from this new form of State negative feedback, further improves the accuracy of audio or video signals subject to State distortion reduction.

FIG. 5A is a perspective drawing of a further improved State distortion reduction device incorporating several other aspects of the invention. This device 70 is similar in basic outline to the device of FIG. 3 in that it also has three 90 degree corners again labeled with primed numbers 1' through 3'. We have discovered that although the device of FIG. 3 has a series odd count of three for reducing State distortion, this construction has a residual even quality which results from this device being either square or rectangular in cross section. Both of these cross sections have four sharp, right angle edges in the path of signal currents rotating around the perimeter of this rectangular or square conductive material. These four 90 degree edges constitute an even count which detracts from the desired overall odd State distortion reducing quality of this device. This problem is corrected in the State device of FIG. 5A, by machining a continuous, substantially square groove 77, along the center of each of the four outer faces of the device. This groove adds a fifth count, raising the total rotational count to an odd number. We have verified experimentally, that larger odd counts create a proportionally more effective State distortion reduction, and that the improved rotational count of five resulting from the groove 77, can be extended to even larger odd count totals by adding thin layers of conductive metal tape 78, to the inner surfaces of the device. Each layer of metal tape applied to a surface adds a count of two, thus one layer brings the rotational count count to, two layers to nine, and five layers to fifteen.

Yet another improvement in distortion reduction is obtained by adding three short "L" shaped conductive metal tape segments, 74, 75 and 76, each having sharp 90 degree corners, to the outside surfaces forming the three corners of State device 70. Again multiple layers are desirable following the same counts used for the inside tape layers 78. These added outer layers of tape act as corner reflectors which help confine electromagnetic energy to the sharp corners of the primary structure, thus increasing the efficiency of State distortion control.

A final improvement over the device of FIG. 3 is the addition of a pair of buffer elements 83 and 86 to which the signal input lead 87 and the signal output lead 88 are connected. These buffers have the same cross section as the main device 70, including groove 81 in buffer 86 and groove 82 in buffer 83. Multi layered conductive tape, 84 is mounted on the inner surface of buffer 83, and multi layered tape 85 is mounted on the inner surface of buffer 86. The junctions 79 and 80 between these buffers and the ends of the State device structure 70, are preferably butt soldered together under pressure so as to minimized the thickness of the layer of solder. The buffers 83 and 86 improve the effectiveness of the State distortion reduction by isolating external circuit elements from the distortion reducing structure 70. Because they connect at a 45 degree angle to the device 70, where they are substantially parallel to each other they are essentially neutral in count.

FIG. 5B is an enlarged drawing of cross section "AA" of the device 70 for the purpose of making clear the method we use to tally a rotational count around this cross section. Two layers of conductive tape 96 and 99, are mounted to the inner surface of signal current path section 90. Groove 97, is the starting point 1', for counting around the cross section. Counting around clockwise in the direction of the arrows, the upper left 90 degree metal corner 2' is the second count. The upper right hand 90 degree metal corner 3', is the third count and the top edges 4' and 5' of tape layers 98 and 99 respectively, are counts 4 and 5. Count number 6 is the outer bottom edge 6' of tape layer 99, and the space between the tape lagers 98 and 99, 7' is count number 7. The 90 degree metal edge 8' is the number 8 count, and the left hand bottom 90 degree metal corner 9' completes the rotational count of 9.

With State distortion reducing devices of this effectiveness, the depth of penetration of eddy currents into the conductive material in relation to the smoothness of the surfaces becomes a major consideration. For example, at the upper end of the audio frequency band, 20 KHz, the eddy current depth in a typical low carbon steel is in about 0.0008". At this same frequency of 20 KHz, the skin depth of copper is about 0.0158". When the surface smoothness of a conductor, that is its peak to trough differences approach the skin depth of eddy currents at a given frequency, this lack of surface regularity causes unevenness in these currents which in turn produce a small change in the signal, which induces yet another source of distortion. Experiments to evaluate the detectability of distortion effects resulting from the smoothness of finish on steel State distortion reduction devices, indicated that surface roughness was clearly audible as an added coarseness in the sound of midband and of higher frequencies. This surface finish related distortion was also noted in similar experiments with copper devices. These tests clearly indicated that for best possible fidelity of signals, a smooth and polished surface on material used in forming a State distortion reduction device is desirable. Theoretically, the smoothness of finish should exceed the eddy current depth at the highest frequency of use. At higher radio frequency signals In the range above 50 MHz, the surface smoothness requirements are formidable, in the order of magnitude of the grain structure of metals, and this criteria can best be satisfied by using noble metals such as silver and gold electro deposited on polished glass or quartz surfaces shaped in the desired current path configurations. As a practical matter, however, our RF experiments using standard commercially rolled copper for constructing low cost high frequency State distortion reduction devices, resulted in substantial improvement in both FM and TV reception.

FIG. 6 is a perspective drawing of a pair of State distortion reducing devices similar to that shown in FIG. 5) aligned one on top of the other, and electromagnetically coupled together to form one example of the feedback circuit of FIG. 4. In order to clarify the drawing, the conductive tape improvements on the inside surfaces and the tape reflectors over the outside corners have been omitted. A pair of State distortion reducing devices, device 100, shown on top, and device 122 show on the bottom, are connected between a signal processor 121 and a signal load 109. The two State distortion reducing devices are joined together by three electrically insulating spacers, 102, 105, and 124, using adhesives designed to join metal to linear dielectric materials such as polystyrene or bakellte. The spacing between the pair controls the amount of feedback coupling and is desirably in the range of 0.015 to 0.200 inches. Positive signal output terminal 117, of signal processor 121, is connected by means of wire 119, to signal input buffer 120, of the upper State distortion reducing device 100. Signal output buffer 105, of device 100, is connected by means of wire 107, to the positive signal terminal 108, of signal load 109. The negative signal terminal 110 of the signal load 109, is connected by means of wire 111 to the input buffer 113, of the lower State distortion reducing device 122. Wire 118 connects between output buffer 114, of the lower distortion reducing device 122, and negative signal terminal 116, of signal processor 121. As shown by the shaded arrows, the signal current flowing in the top State distortion reducing device 100, circulates in a direction opposite to the signal current in the bottom State distortion reducing device 122. These opposing signal currents generate opposing electromagnetic fields which couple signal feedback energy between the two devices. The effect of this negatively coupled feedback is to produce a further reduction in State distortion.

Figure 9:
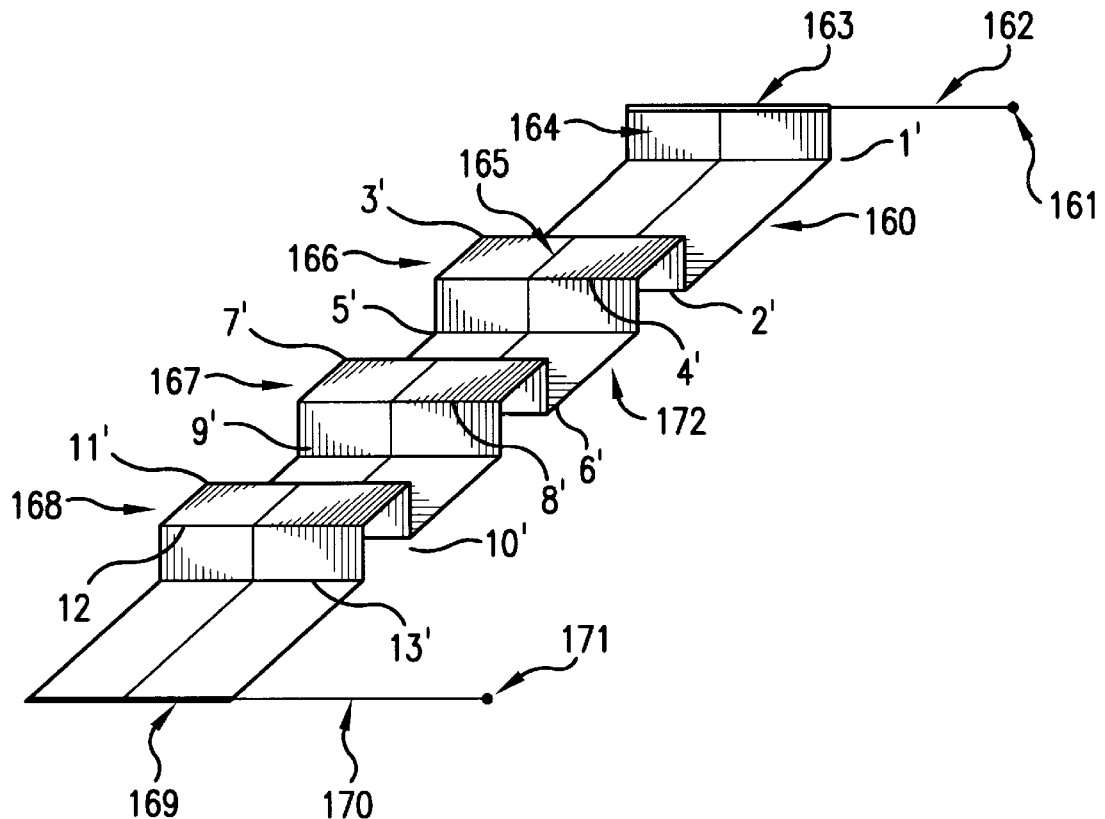
FIG. 9 is a drawing depicting still another variation of a State distortion reducing device, utilizing thin ribbon like conductive material.

FIG. 7A is a drawing of another variation of a State distortion reducing device made from very thin, ribbon-like conductive material. State distortion reducing device 130, is formed from electrically conductive material having a thickness in the range of about 0.003 inches to 0.015 inches. Conductive metals, such as copper or soft steel in this thickness range can be readily formed into sharp 90 degree corners so as to form efficient State distortion reduction junctions. As stated above, in the discussion of FIG. 2, the thickness of cross section of a State distortion reducing conductor should exceed the penetration depth of eddy currents at the lowest frequency of use. Thus the device of FIG. 7A, if constructed of thin copper ribbon, can be expected, and indeed does work well at RF frequencies. For audio frequencies, the thin ribbon construction of FIG. 7A would appear to violate this requirement. We have, however, unexpectedly discovered that the frequency related behavior of a thin, relatively wide ribbon conductor in the State distortion reducing form shown in FIG. 7A, is different from that of a round wire or of the substantial cross section rectangles of FIG. 5A and FIG. 6. We have observed that when using a thin ribbon-like conductor for constructing a State distortion reducing device, the controlling factor in defining the lowest frequency of efficient State distortion correction, is not the thickness but the width of the ribbon material. Increasing the width of a conductive ribbon used for a State distortion reduction device leads to improvements in overall State distortion reduction as well as an extension of State distortion reduction to lower frequencies. Some mathematical papers on the subject of eddy current distribution in thin ribbon conductors, especially the referenced paper by V. Belevitch in The Philips Technical review, have indicated that eddy currents do act differently in very thin conductors and tend to increase in density towards the outer edges of a ribbon like conductor. This current displacement may be offsetting the thinness of the conductive material, so as to improve low frequency State distortion reduction. Regardless of a physical explanation, our experiments with thin ribbon like conductors conclusively verified that practical, easily fabricated, State distortion reducing devices, as shown in FIG. 7 through FIG. 9, can be made from thin steel ribbon like material, and are effective at audio frequencies.

The State distortion reduction device 130, shown in FIG. 7A, has a signal input terminal 135, connected to a source of signals, not shown. Connecting wire 136, is soldered in contact with input signal terminating edge 137, of the device 130. We have found this form of lead attachment convenient though other techniques such as welding can be used. A set of primed numbers identify each 90 degree bend of the device, which here are numbered 1' through 5'. Because of the use of such thin material these devices can be easily deformed. To counteract this, a small nonconductive "L" shaped stabilizer 131, is added between 90 degree bends 1' and 5'. As was explained above in conjunction with FIG. 5A, a groove 136, is cut or embossed from end to end on either the inner or outer surface of this device, in FIG. 7A, the groove is shown on the outer surface. This groove serves the same purpose as that shown in FIG. 5A of converting the State count around the perimeter of the cross section of the device from a four to a more desirable five. Surprisingly, this groove, only 0.001–0.002 inches deep in a steel device constructed from 0.005 inch sheet steel, has proven effective even at low audio frequencies. Experiments with grooves in thicker material structures such as that shown in FIG. 5, and on loudspeaker plates, as discussed above, clearly established that the effectiveness of a State count setting groove was limited if the depth of eddy current penetration at a given frequency exceeded the depth of the groove. In very thin materials, however, particularly when the width is much greater than the material thickness, other experiments have shown that this relationship appears to be different. For a thickness-to-width ratio in excess of about 100 to 1, a single shallow groove, or multiple numbers of grooves which are only 0.0001 inches to 0.003 inches deep, is surprisingly effective in extending State distortion reduction to low audio frequencies.

FIG. 7 B is across section "AA" of the ribbon material 130, and shows the a single groove 138, approximately centered on an outer face of device 130. We have also tested using five grooves, evenly spaced on an outer face of a steel State distortion reducing device, to create a rotational count of nine. These extra rotational counts resulted in a substantial improvement in reducing overall State distortion and extending these effects to lower frequencies. An effective State distortion reduction device as shown in FIG. 7A, usable for audio frequencies, was constructed from polished low carbon sheet steel 0.005 inches thick, approximately one inch between 90 degree bends, and in differing ribbon widths, between one and four inches. In each instance the wider device proved superior in both effectiveness of State distortion reduction and in low frequency extension. These differences became less obvious when multiple State controlling grooves were added to each device. For FM or TV frequencies a device of 0.003 inch copper foil was constructed to be 0.350 inches square and 0.200 inches tall. Radio frequency devices also benefited from having one or more grooves added to increase the rotational count.

FIG. 8 is a drawing of a State distortion reducing device 150, which is an extended count version of the device of FIG. 7A, in this case a State correcting count of 9. As in FIG. 7A each 90 degree junction is identified with a prime number., and a non conductive stabilizing brace 151 is added. Input lead wire 156 connects between input terminal 155 and edge 157 of State device 150, and output lead wire 153 connects between output terminal 154 and edge 152 of State device 150, as shown in the drawing. The larger number of State correcting junctions in this device, improves its distortion reducing properties. The same height, material, and thickness factors discussed in regard to the device of FIG. 7A apply in this case. Although omitted for the sake of clarity, one or more grooves as shown in FIG. 7A, and FIG. 7B, will further improve the State distortion reduction of this device. Thin conductive tape, such as shown in FIG. 5A and FIG. 5 can also be used to increase rotational State count.

FIG. 9 is a drawing illustrating a State distortion reducing device formed from thin ribbon like conductive metal, different in structure from those shown in FIG. 8 and FIG. 9. This form of Sate corrective device has the advantage of being shallow in one dimension and also of having a larger flat area for increasing the coupling between a pair of such devices, used in a feedback configuration as shown in FIG. 4. This construction also makes it feasible to increase the total number of 90 degree bends, to a large number, 45 for example, in a relatively small State distortion reducing package. Its only disadvantage in relation to the devices of FIG. 7 and FIG. 8, Is a larger external field, which in some applications, can couple to other circuit elements.

In FIG. 9, a signal input terminal 161, is connected by wire 162, soldered along a first edge termination 163, of surface 164. Surface 164 is bent at a 90 degree angle, identified as 1, to the plane of State distortion correcting device 160. As in prior drawings, each State correcting 90 degree junction of a device is identified with a primed number; in FIG. 9 these junctions total 13. Three sub groups of 90 degree bends, 166, 167, and 168, each sub group comprising four 90 degree bends, resembling a three sided, open ended box structure, form 12 additional 90 degree State correcting junctions, herein identified with the primed numbers 2' through 13' respectively. These twelve 90 degree State junctions total an undesirable even count, and thus the extra 90 degree bend 1' at the signal input end of this device, turns the total count odd. Signal output is taken from a wire 170, soldered substantially covering the edge 169. The signal output wire 170 in turn connects to signal output terminal 171. As discussed above, a longitudinal groove 165, extending from signal input end 163 to signal output end 169, serves to make the rotational count of the device odd. Additional grooves totaling an odd number further improve rotational counts, which increase the effective State distortion reduction. As described in conjunction with FIG. 7A and FIG. 8, the material and dimensions of a State distortion reducing device constructed as in FIG. 9, depend on the frequency range over which it is to function. Ribbon steel, 0.005 inches to 0.015 inches in thickness by about 0.5 inches to 3 inches in width, is suitable for audio signals. Copper, silver, or aluminum 0.002 inches to about 0.005 inches is preferable for higher RF frequencies. As described above better results are obtained with materials having a smooth and polished finish. A pair of State correcting devices of this type can easily adapted for use in the feedback circuit of FIG. 4. For this purpose the bottom surface 172, of each device can seperated a suitable distance apart by installing insulating spacers glued between the two bottom surfaces, in a manner similar to that shown in FIG. 6.

Figure 10:
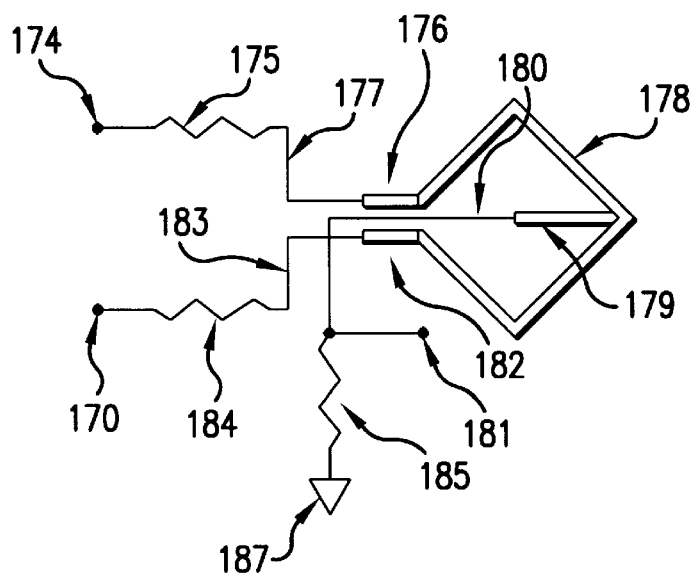
FIG. 10 is a circuit drawing of a signal mixing circuit stabilized by means of a center tapped State device, of the invention.

FIG. 10 is a schematic drawing which uses another variation of a distortion reducing device of the invention, similar to that of FIG. 5A, but with the addition of an electrical and State center tap. This form of State correcting device simplifies some circuit applications in which the number of State distortion reducing devices can be reduced. The circuit of FIG. 10 is derived from a basic resistive signal combining network, well known in the prior art. We have previously referred to the accidental or deliberate addition of signals as one cause of State distortion. This distortion arises from odd to even changes in the adding process itself. The sum of 1+1 is 2., an even number, which in signal processing combining circuits converts any pair of identical signals to an even State. When these two signals are only partly alike, as for example in adding a left channel stereo signal and a right channel stereo signal to create a monophonic signal, the result is a sum signal which varies in State stability in response to variations in common signal information. In mixing signals from 24 or 48 track master tape recordings, so as to end with a two track stereo recording, the signal addition State distortion problem accompanies each step. The inclusion of a State distortion reducing device of the invention, in signal processor mixing circuits, can significantly reduce this problem.

In FIG. 10, a first signal input terminal 174 connects to isolation resistor 175 which is connect by wire 177 to signal input buffer 176, of center tapped State distortion correcting device 178. A second signal input terminal 186 connects to isolation resistor 184, which in turn is connect by wire 183 to signal input buffer 182, of State device 178. As a result of these connections, each of the two signal inputs are also isolated from each other by one half of State device 178, and the two input signals are added together at the center tap 179. Center tap output wire 180 is connected to the junction of the load resistor 182, and the signal output terminal 181. This added isolation in State has the effect of reducing State distortion and signal instabilities which a conventional mixing circuit creates.

Figure 11:
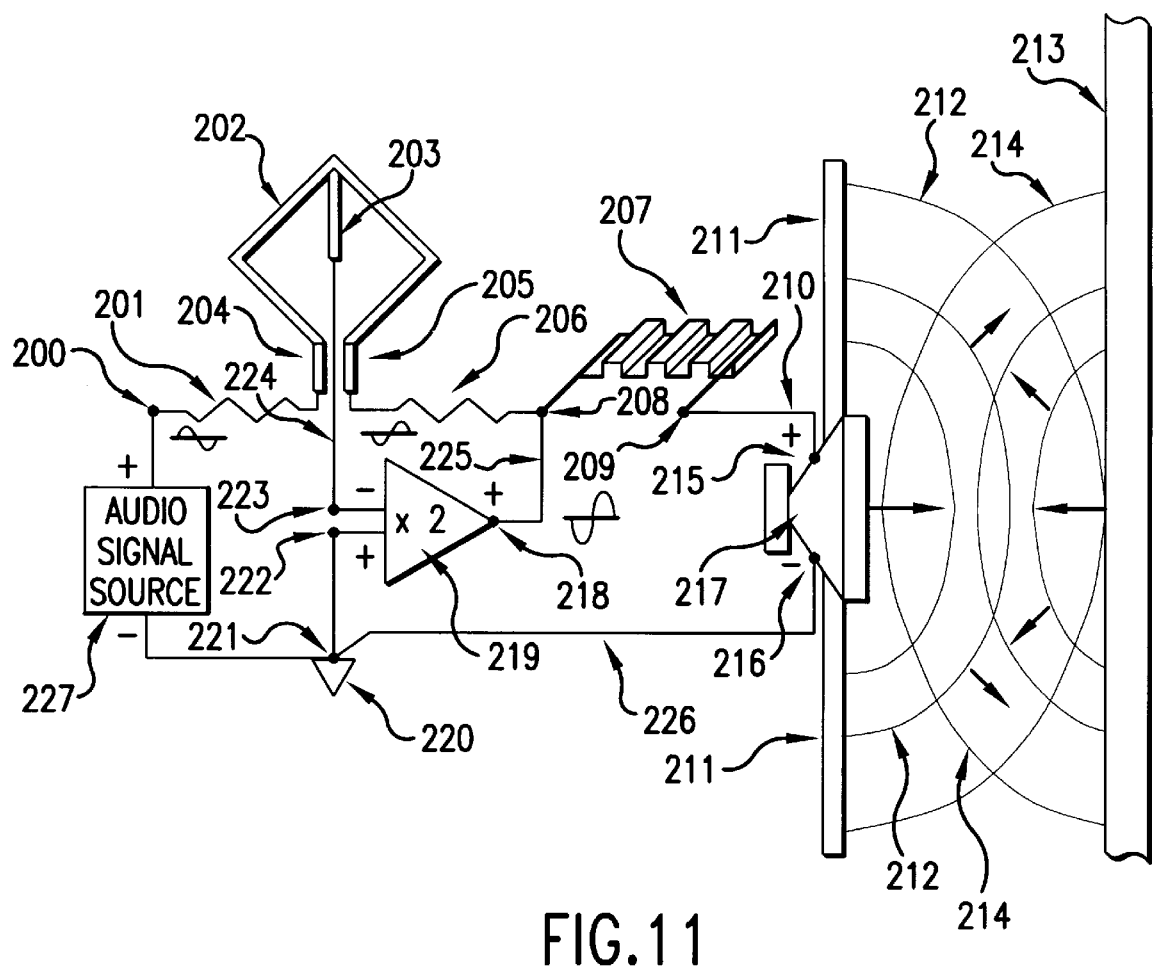
FIG. 11 is a drawing of a sound reproduction system including an audio amplifier circuit coupled to a transducer, including aspects of the invention for controlling acoustic reverberation.

FIG. 11 is a drawing of a sound reproduction system including an audio amplifier circuit coupled to a transducer, and further showing the interaction of the transducer with its acoustic environment. An audio signal source 227 is connected to signal input terminal 200, which is connected to one end of isolation resistor 201. The other end of resistor 201 is connected to one buffered input section 204, of odd State distortion correcting center tapped device 202, similar to the center tapped State device shown in FIG. 10. The buffered output 205, of State device 202, connects with one end of series feedback resistor 206. Center tap 203 of State device 202 is the junction and summing point of the input signal, isolated by resistor 201, and an attenuated feedback signal from the output of amplifier 219. The output signal of center tap 203, is connected by wire 224 to the phase inverting signal input terminal 223 of the audio amplifier 219. Except for the inclusion of State device 202, this series feedback circuit is well known in the art. The sine wave notations, near the input terminal 200 and the output terminal 218 of amplifier 219, indicate the phase of the audio signal at these points in the circuit. Every negative feedback circuit functions as a comparator circuit wherein two out of phase signals are subtracted so as to form a error correcting signal capable of reducing the distortion generated by circuitry included within the feedback loop. This subtraction process cancels out a portion of nondistorted identical signals. As explained in conjunction with the summing circuit of FIG. 10, this type of signal combining creates a variable form of State distortion, which in the case of the signal subtraction in a negative feedback circuit, is even more objectionably unstable. We believe that this State unstable form of distortion is the primary source of dissatisfaction among audio experts with the use of negative feedback. Inserting State device 202 in the feedback circuit decreases this State instability so as to improve the results of negative feedback in all signal processing circuits. In other configurations of negative feedback circuits, a non center tapped State device can be included in series with a feedback gain setting resistor, serving the function of resistor 206 in FIG. 11.

The output signal terminal 215 of amplifier 219 is also shown connected to transducer 217, by means of wire 225, which connects to input terminal 208 of an additional State distortion reducing device 207. Signal output terminal 209, of State device 207, is connected to the positive signal terminal of transducer 217, by means of wire 210. The negative signal terminal 216 of transducer 217 is connected to the common audio ground point 220 by means of wire 226. The transducer 217 is shown pictorially mounted to a baffle 211. Acoustic energy output radiating from the transducer 217 is shown by partial circular lines 212, coupled to shaded arrows pointing to the right. Also shown in representational form is a wall or other reflector of acoustic energy 213. Some of the acoustic output of transducer 217 is reflected back towards transducer 217, as shown by the partial circular lines 214 and shaded arrows facing to the left. Some of this reflected acoustic energy is intercepted by the transducer 217, which, if it is bidirectional, as many transducers are, will act as a microphone and transform these reflected acoustic signals into electrical signals. These signals are time delayed by the slow rate of travel of acoustic energy, approximately 1100 feet per second, wherein they are fed back through the negative feedback circuit, and are injected into the amplifier input signal terminal, 223. Because of the time delay, there is no corresponding input signal to subtract from these delayed feedback signals. As a result these secondary, unwanted, time delayed signals are amplified, and then reintroduced Into the transducer to be radiated again. This time delay process is the reason the acoustic decay time of an enclosed acoustic environment is increased when an electronicly amplified sound system is introduced. In the worst case, with a microphone as an input signal, this time delayed acoustic loop feedback can lead to system oscillation. One of the unexplained attributes or a State device is its ability to discriminate and reduce secondary signals which are not closely related in time to the primary signal. This desirable capability has demonstrably improved the acoustic quality of even large acoustic spaces when State distortion reduction devices have been included in an amplified electronic sound system. This time discriminating attribute of State devices is one of several fundamental processes which produce the distortion reducing benefits obtainable. This time discriminating quality makes the inclusion of these devices between an audio power amplifier and a loudspeaker necessary if accurate signal processing is to be obtained.

Figure 12:
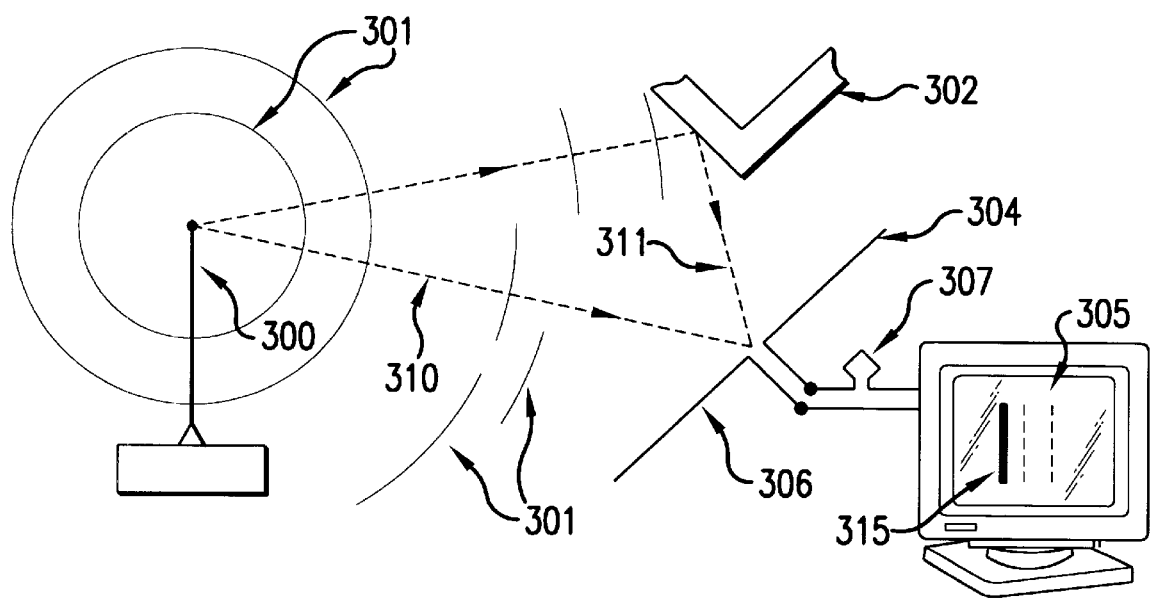
FIG. 12 is a representation of a State distortion reducing device in the circuit of a television antenna system.

FIG. 12 is a representational drawing of a television RF transmission and receiving system. A transmitting antenna 300 is shown as a source of RF electromagnetic waves, represented by the arc segments 301. The doted line 310 indicates a direct line of sight path to a dipole antenna with receiving elements 304 and 306. High frequency radio signals are well known to have multipath problems due to reflections from large surfaces—typically, tall buildings. One such reflecting surface 302 is shown directing a second signal 311, to the receiving antenna. This reflected signal has a longer path of travel and thus arrives at the receiving antenna after the direct line of sight signal. The lines 315 on the TV screen are a depiction of time delayed mutipath signals. This form of signal addition is not unlike the situation described for acoustic signals in FIG. 11. For this reason we experimented with adding a State distortion reducing device 307, located between one of the input wires from the receiving antenna and a television receiver 305. While this addition did not noticeably reduce the effects of strong mutipath signals, it did make a large improvement in the signal, both in FM sound quality and in picture quality. Picture detail and color rendition were improved and a three dimensional quality never before noticed became evident. Other tests using FM antennas and broadcast signals demonstrated noticeable improvements in stereo image depiction, and in the overall accuracy of audio reproduction. We believe that these improvements are due to the ability of a State distortion reducing device to reduce some forms of time displaced signals, in relation to the main desired signal.

What has been described is a novel arrangement for reducing distortion in signal processing systems. It is recognized that numerous changes in the described embodiment of the invention will be apparent to those skilled in the art without parting from its true spirit and scope. The invention is to be limited only as defined in the claims.

What is claimed is:

1. An information signal processing system comprising: system signal input terminal means, system signal output terminal means, signal processing means coupled between said system signal input terminal means and said system signal output terminal means, a source of information signal current of a useful range of frequencies coupled to said system input terminal means, said signal processing means acting on said information signal current to impose additional undesirable signal distortions on said information signal current, and at least a first signal distortion reducing means forming a current path pattern for said information signal current, connected in the signal path between the output of said signal processing means and said system output terminal means, comprising at least four signal conductive, substantially straight, series connected, adjoining, substantially self supporting signal current path sections, pairs of said adjoining signal current path sections forming, at least three signal distortion reducing junctions, each of said junctions producing a substantially abrupt, near 90 degree change in the direction of signal current flow, said current path pattern additionally forming at least one pair of parallel opposing current path sections wherein said signal current in each opposing section of any of said parallel opposing current path pair, flow in opposite directions, said current path pattern thereby configured to reduce said distortions in said information signals by minimizing electromagnetic field coupling between pairs of said adjoining current path sections and between pairs of said parallel opposing current path sections.

2. An improved information signal processing system comprising, a system signal input terminal means, a source of information signal current to be processed of a useful range of frequencies coupled to said system input terminal means, system signal terminal output means, and signal processing means for processing said information signal current coupled between said system signal input and said system signal output terminal means, and introducing additional distortion in said information signal current processed thereby, said improvement comprising a first distortion reducing means coupled between the output of said signal processing means and said system output terminal means, said first distortion reducing means forming a current path pattern for said information signal current, comprising at least four, substantially straight, series connected, adjoining, conductive signal current path sections, pairs of said adjoining signal current path sections forming at least three signal distortion reducing junctions, each of said junctions producing a substantially abrupt, near 90 degree change in the direction of said signal current flow, said current path pattern additionally forming at least one pair of parallel opposing current path sections, wherein said signal current in each opposing section of any of said parallel opposing current path pair, flows in opposite direction, said current path pattern thereby configured to reduce said distortions in said information signals by minimizing electromagnetic field coupling between pairs of said adjoining current path sections and between pairs of said parallel opposing current path sections.

3. A distortion reducing signal processing structure for an information carrying signal circuit, and comprising:

A. input terminal means for connection to a source of distorted signal current, including State distortion, of a useful range of frequencies, B. output terminal means for conveying the processed current of said signal processing structure to a termination point of use, C. a first signal distortion reducing means coupled between said input terminal means and said output terminal means and forming a current path pattern for said signal current comprising at least four adjoining, conductive, substantially straight, series connected signal current path sections, pairs of said adjoining signal current path sections forming an odd number of signal distortion reducing junctions, each of said junctions producing a substantially abrupt, near 90 degree change in the direction of said signal current flow, said current path pattern additionally forming at least one pair of parallel opposing current path sections, wherein said signal current in each opposing section of any of said parallel opposing current path pair, flow in opposite directions, said current path pattern thereby configured to reduce said distortions in said information signals by minimizing electromagnetic field coupling between pairs of said adjoining current path sections and between pairs of said parallel opposing current path sections.

4. A distortion reducing signal processing structure for an information carrying signal circuit, comprising:

A. input terminal means for connection to a source of distorted signal current, including State distortion, of a useful range of frequencies, B. output terminal means for conveying the processed current of said signal processing structure to a termination point of use, C. a first signal distortion reducing means coupled between said input terminal means and said output terminal means and forming a current path pattern for said signal current comprising at least four adjoining, conductive, substantially straight, series connected signal current path sections, pairs of said adjoining signal current path sections forming an odd number of signal distortion reducing junctions, each of said junctions producing a substantially abrupt, near 90 degree change in the direction of said signal current flow, said current path pattern additionally forming at least one pair of parallel opposing current path sections, wherein said signal current in each opposing section of any of said parallel opposing current path pair, flow in opposite directions, said current path pattern thereby configured to reduce said distortions in said information signals by minimizing electromagnetic field coupling between pairs of said adjoining current path sections and between pairs of said parallel opposing current path sections, and wherein said current path sections have at least one longitudinally extending groove in at least one surface of each of said current path sections.

5. An improved radio frequency receiving system comprising a radio frequency receiving antenna having output terminal means connected to input terminal means of a frequency selective tuner capable of tuning a selected portion of the radio frequency spectrum, said radio frequency antenna intercepting undesirable interfering multipath radio frequency signals, said improvement comprising the addition of at least a first radio frequency mutipath interference reducing means connected between said antenna output terminal means and said input terminal means of said radio frequency selective receiving system means, said radio frequency mutipath interference reducing means forming a radio frequency current path pattern, said radio frequency current path pattern including at least four signal conductive, substantially straight, adjoining, radio frequency current path sections, pairs of said adjoining radio frequency signal current path sections forming at least three radio frequency signal modifying junctions, each of said radio frequency junctions producing a substantially abrupt, near 90 degree change in the direction of said radio frequency signal current flow, and wherein said radio frequency current path pattern additionally forms at least one pair of parallel opposing radio frequency current path sections, wherein said radio frequency signal current in each opposing section of any of said parallel opposing current path pair, flow in opposite directions, said radio frequency current path pattern thereby configured to reduce said multipath interference in said radio frequency signals by minimizing electromagnetic field coupling between pairs of said adjoining current path sections and between pairs of said parallel opposing current path sections.

6. A distortion reducing signal processing structure comprising:

A. a first signal input terminal means for connection to a common signal source of distorted signal current, including State distortion, and a first signal output terminal means for connection to a common signal load, B. a first signal distortion reducing means forming a current path pattern for said information signal current, coupled between said first signal input terminal means and said first signal output terminal means, said first distortion reducing means including at least four conductive, substantially straight, adjoining, series connected signal current path sections, pairs of said adjoining signal current path sections forming an odd number of signal distortion reducing junctions, each of said junctions producing a substantially abrupt, near 90 degree change in the direction of said signal current flow, said current path pattern additionally forming at least one pair of parallel opposed, current path sections wherein said signal current in each opposing section of any of said parallel opposing current path pair, flow in opposite directions, said current paths forming a current path pattern for reducing said distortion in said information signals, by minimizing electromagnetic field coupling between each of said adjoining and each of said parallel current path sections, C. a second distortion reducing signal processing means, substantially the same as said first distortion reducing signal processing means, and having a second signal input terminal means for connection to said common signal source, and a second signal output terminal means for connection to said common signal load, said second distortion reducing signal processing structure electromagnetically coupled and electrically insulated from said first distortion reducing signal processing structure means, so that geometrically corresponding signal path sections of each of said first and second signal distortion reducing means are superimposed, and and wherein said signal connections to said first and said second distortion reducing signal processing structure means, are so connected to said common signal source and said common signal load as to direct said signal currents in said first distortion reducing signal processing structure to flow in a direction opposite to the direction of flow of said signal currents flowing in each of said corresponding portions of said second signal distortion reducing signal processing means.

7. A signal processing system system, comprising:

An inductively coupled pair of distortion reducing signal processing structures; a source of distorted input signals common to both of said distortion reducing signal processing structures; a signal load common to both distortion reducing signal processing structures; and a first signal input terminal means connecting to said common signal source and a first signal output terminal means connecting to said common signal load;

a first distortion reducing signal processing structure coupled between said first signal input terminal means and said first signal output terminal means, said first distortion reducing signal processing structure including at least four conductive, substantially straight, adjoining, series connected signal current path sections, pairs of said adjoining signal current path sections forming at least three signal distortion reducing junctions, each of said junctions producing a substantially abrupt, near 90 degree change in the direction of said signal current flow, said current path pattern additionally forming at least one pair of parallel opposed, current path sections wherein said signal current in each opposing section of any of said parallel opposing current path pair, flow in opposite directions, said current paths forming a current path pattern for reducing said distortion in said information signals, by minimizing electromagnetic field coupling between each of said adjoining and each of said parallel current path sections, and a second distortion reducing signal processing structure, substantially the same as said first distortion reducing signal processing structure, and having a second signal input terminal means connected to said common signal source, and a second signal output terminal means connected to said common signal load, said second distortion reducing signal processing structure electromagnetically coupled and electrically insulated from said first distortion reducing signal processing structure means, so that geometrically corresponding signal path sections of each of said first and second signal distortion reducing structures are superimposed, and and wherein said signal connections to said first and said second distortion reducing signal processing structure means, are so connected to said common signal source and said common signal load as to direct said signal currents in said first distortion reducing signal processing structure to flow in a direction opposite to the direction of flow of said signal currents flowing in each of said corresponding portions of said second signal distortion reducing signal processing means.

8. The system of claims 1 or 5 or the structure of claim 3 wherein said current path junctions are formed by bends in a strip of thin rectangular sheet metal whose thickness is less than about 0.05 inches.

9. The system of claims 1, 2 or 5 wherein exposed surfaces of said signal current path sections are smooth and polished and wherein the surface smoothness is such that the RMS variation in surface deviation is no greater than about 0.0005 inches.

10. The system of claim 1 or 2, or the structure of claim 3, further including an additional conductive element electricaly attached to a selected point, substantially at a near 90 degree junction, said point selected such that an equal, even number of substantially complete current path sections are located on each side of said selected near 90 degree junction, said additional conductive element connected to a termination point of use.

11. The system of claims 1 or 2, wherein said signal processing means further includes signal combining means, for converting pairs of signals of an arbitrary phase relation to each other into a single combination signal, said combination signal including undesirable State distortion, and wherein said distortion reduction means further includes a conductive center tap structure, electrically connected to one of said junctions, said conductive center tap structure connected in a common circuit path with said combination signal and connected to a termination point of use.

12. The systems of claim 1 or 2, or the structure of claim 5 further including at least one "L" shaped structure, having a near 90 degree bend therein and constructed of at least one layer of relatively thin material, said near 90 degree bend in said "L" shaped structure positioned in close nesting proximity to said junctions formed by any two of said current path sections.

13. The system of claims 1 or 2, or the structure of claim 5, wherein the outer ends of two of said series connected current path sections each have added buffer means, of substantially similar cross section to said current path sections and projecting outwardly therefrom, said buffer means having an overall length so as to be at least a substantial fraction of each of said current path sections, and positioned so as to be substantially parallel to each other, and wherein each of said buffer means is connected to a termination point of use.

14. The structure of claims 3, 4 or 6 further including at least one layer of thin ribbon like conductive material attached to at least one surface of said current path sections.

15. The system of claims 1 or 2 or the structure of claim 3, further including audio power amplifying means, having output terminal means, connected to input terminal means of a bidirectional or reciprocal audio transducer, said bidirectional audio transducer located in a volume of space enclosed by boundaries capable of reflecting acoustic energy, and wherein said reflected acoustic energy is received by said bidirectional audio transducer to undesirably increase reverberation in said enclosed space, and wherein at least one, of said distortion reducing means, is connected between at least one of said output terminal means of said audio amplifying means, and at least one of said input terminal means of said bidirectional transducer, for reducing said increase in said reverberation.

\* \* \* \* \*